(12) United States Patent
Hong et al.

(10) Patent No.: US 9,278,423 B2
(45) Date of Patent: Mar. 8, 2016

(54) CMP SLURRY PARTICLE BREAKUP

(71) Applicant: Taiwan Semiconductor Manufacturing Company, Ltd., Hsin-Chu (TW)

(72) Inventors: William Weilun Hong, Hsinchu (TW); Kuo-Min Lin, Taichung (TW); Ying-Tsung Chen, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 150 days.

(21) Appl. No.: 14/048,967

(22) Filed: Oct. 8, 2013

(65) Prior Publication Data
US 2015/0099431 A1    Apr. 9, 2015

(51) Int. Cl.
*B24B 57/02* (2006.01)
*B01D 29/52* (2006.01)
*B24B 37/04* (2012.01)

(52) U.S. Cl.
CPC .............. *B24B 37/042* (2013.01); *B01D 29/52* (2013.01); *B24B 57/02* (2013.01)

(58) Field of Classification Search
CPC ................................ B24B 37/06; B24B 57/02
USPC ........................................ 451/56, 60, 446, 36
See application file for complete search history.

(56) References Cited

U.S. PATENT DOCUMENTS

| | | | |
|---|---|---|---|
| 6,053,802 A * | 4/2000 | Yi et al. ........................... | 451/60 |
| 6,358,125 B2 * | 3/2002 | Kawashima et al. ............ | 451/60 |
| 7,419,946 B2 * | 9/2008 | Hiraoka et al. ................. | 510/175 |
| 2002/0022441 A1 * | 2/2002 | Sugai .............................. | 451/60 |
| 2011/0017230 A1 * | 1/2011 | Erk et al. .......................... | 134/1 |

* cited by examiner

*Primary Examiner* — Monica Carter
*Assistant Examiner* — Lauren Beronja
(74) *Attorney, Agent, or Firm* — Haynes and Boone, LLP

(57) ABSTRACT

A method for breaking up Chemical Mechanical Polishing (CMP) slurry particles includes receiving a CMP slurry comprising particles suspended in a solution, placing the slurry into a first agitation tank, and agitating the slurry at a first frequency. The first frequency is selected to break up particles having a size within a specified range.

20 Claims, 7 Drawing Sheets

CMP SLURRY PARTICLE BREAKUP

BACKGROUND

Integrated circuits may be formed using various photolithographic techniques. Such techniques typically include use of a Chemical Mechanical Polishing (CMP) process. The CMP process is typically used to grind down and smooth the surface of a semiconductor substrate. In some cases, the CMP process is used to remove some or all of previously formed layer(s) that are no longer needed. For example, trenches may be formed into a semiconductor substrate. Various other layers of material may be deposited within the trenches. To simplify the deposition process, these layers are deposited on the entire semiconductor substrate, including the trench areas and non-trench areas. To remove the deposited layers from the non-trench areas, the CMP process may be applied to grind away the deposited layers.

The CMP process uses a slurry that includes a chemical solution with a specific viscosity that will hold very small particles. The particles are made of a hard material such as silica ($SiO_2$) or alumina ($Al_2O_3$). These particles help grind away and smooth the surface of the substrate. These particles should be within a specific size range. Particles that are too large can cause unwanted scratches on the surface of the semiconductor substrate. Particles that are too small will not effectively grind the surface of the substrate. Thus, the CMP slurry is typically put through a filter to remove larger pieces. It is desirable, however, to have a solution with fewer large particles that have to be filtered out.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of the disclosure. Specific examples of components and arrangements are described below to simplify the present disclosure. These are, of course, merely examples and are not intended to be limiting. Moreover, the performance of a first process before a second process in the description that follows may include embodiments in which the second process is performed immediately after the first process, and may also include embodiments in which additional processes may be performed between the first and second processes. Various features may be arbitrarily drawn in different scales for the sake of simplicity and clarity. Furthermore, the formation of a first feature over or on a second feature in the description that follows may include embodiments in which the first and second features are formed in direct contact, and may also include embodiments in which additional features may be formed between the first and second features, such that the first and second features may not be in direct contact.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Figure 1:
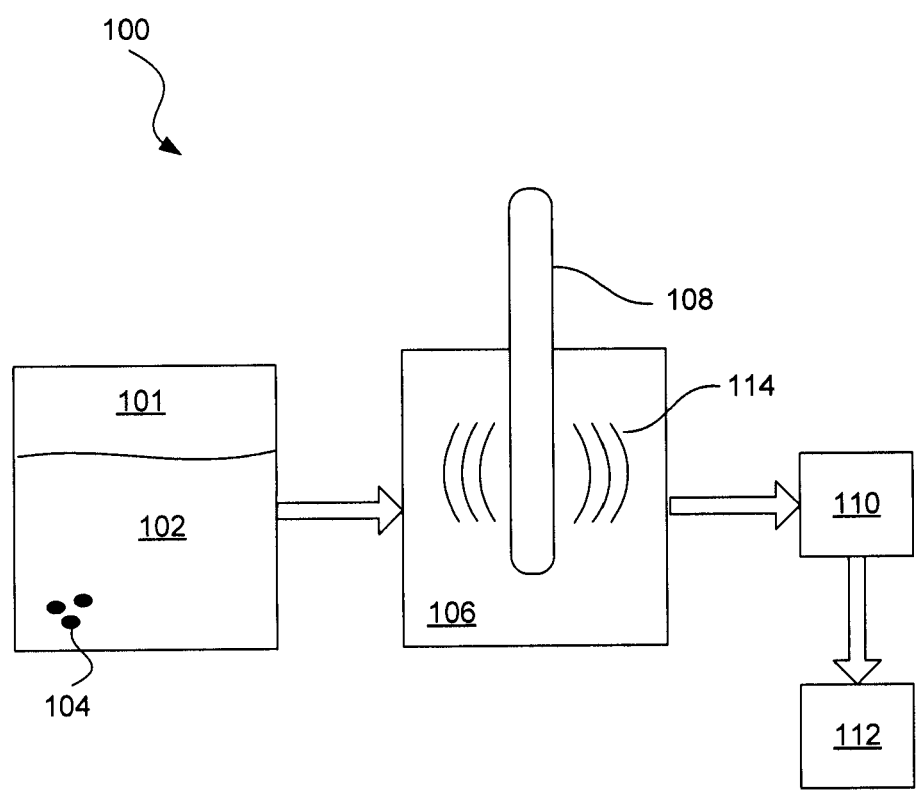
FIG. 1 is a diagram showing an illustrative CMP slurry delivery system, according to one example of principles described herein.

FIG. 1 is a diagram showing an illustrative CMP slurry delivery system 100. According to the present example, the CMP delivery system 100 includes a holding tank 101 to hold a CMP slurry 102. The CMP slurry 102 includes small particles 104 suspended within the slurry solution. The delivery system 100 further includes an agitation tank 106 with an agitation mechanism 108. The CMP delivery system 100 also includes a filter 110 and a CMP tool 112.

The holding tank 101 is used to hold or store the CMP slurry 102. The CMP slurry includes various chemicals that are used in etching processes. The chemicals help break up the surface of the substrate for removal. The CMP slurry 102 is full of small particles 104 that are made of a hard material such as silica or alumina. These particles are intended to range from about 80 nanometers to 220 nanometers.

In many cases, agglomeration of the particles 104 may occur. Some particles 104 may be much larger than desired. For example, some particles 104 may be greater than 500 nanometers. These larger particles 104 have the potential to cause issues with the polishing process, particularly by scratching. Thus, it is desirable to have such larger particles broken up into smaller particles that are within the desired range of particle sizes.

According to the present example, the CMP slurry 102 is placed into an agitation tank 106. The agitation tank 106 includes an agitation mechanism 108 that vibrates at certain frequencies 114 designed to break up the particles. As will be discussed in further detail below, these frequencies 114 may be within either an ultrasonic range or a megasonic range. Additionally, the frequency 114 of agitation may be set to vary over time to more effectively break up the particles 104.

After the agitation process is complete, the CMP slurry 102 is delivered to a filter 110. The filter 110 is used to remove particles that are larger than desired. Because of the agitation process, there will be fewer large particles that have to be filtered out. This relieves the burden on the filter 110 and allows for a smoother delivery process. Particularly, having fewer particles to remove with the filter 110 allows for a faster and more stable CMP process time. It also reduces the number of unwanted scratches on the surface of the substrate.

After passing through the filter 110, the CMP slurry 102 is delivered to the CMP tool 112. The CMP tool 112 applies the CMP slurry 102 to the surface of the substrate while the polishing tool grinds at the surface. The combination of the corrosive solution and the grinding particles 104 creates both the chemical and mechanical polishing process that more effectively grinds and polishes the surface of the substrate.

Figure 2:
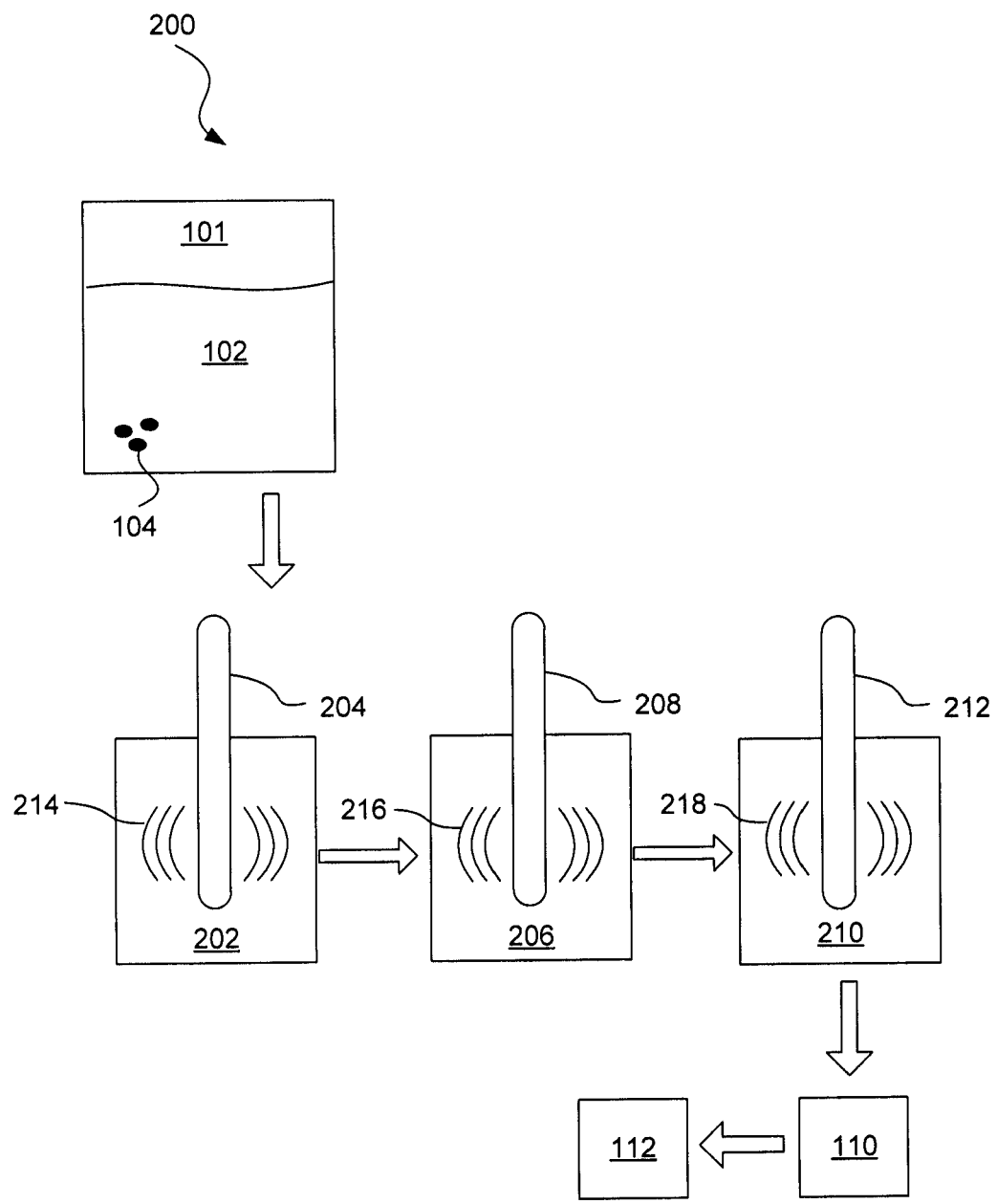
FIG. 2 is a diagram showing an illustrative CMP slurry delivery system with multiple agitation tanks, according to one example of principles described herein.

FIG. 2 is a diagram showing an illustrative CMP slurry delivery system 200 with multiple agitation tanks 202, 206, 210. According to the present example, the system 200 includes three agitation tanks 202, 206, 210, each tank having its own agitation mechanism 204, 208, 212. The delivery system 200 may be set up so that the CMP slurry 102 passes through each of the agitation tanks 202, 206, 210.

For example, the CMP slurry 102 may be delivered to the first agitation tank 202. The agitation mechanism 204 of the first agitation tank 202 will then agitate the CMP slurry 102 at a specific frequency 214. This frequency 214 may be a relatively low frequency. Lower frequencies have larger wavelengths. These larger wavelengths are better for breaking up larger particles. Thus, the first frequency 214 is applied first in order to break up the larger particles before breaking up smaller particles.

The CMP slurry 102 is then removed from the first agitation tank 202 and delivered to the second agitation tank 206. The agitation mechanism 208 of the second agitation tank 206 will then agitate the CMP slurry 102 at a different frequency 216. This frequency 216 may be higher than the first frequency 214. Thus, the wavelength of the second frequency 216 will be smaller than the wavelength of the first frequency 214. This will cause the breakup of slightly smaller particles than was caused by the agitation mechanism 204 of the first agitation tank 202.

The CMP slurry 102 is then removed from the second agitation tank 206 and delivered to the third agitation tank 210. The agitation mechanism 212 of the third agitation tank 210 will then agitate the CMP slurry 102 at a different frequency 218. This frequency 218 may be relatively higher than the previous frequencies 213, 216. Thus, the frequency 218 will produce the smallest wavelengths to break up smaller particles. After passing through each of the agitation tanks 202, 206, 210, the CMP slurry 102 will be delivered to the filter 110 and then to the CMP tool 112.

Figure 3:
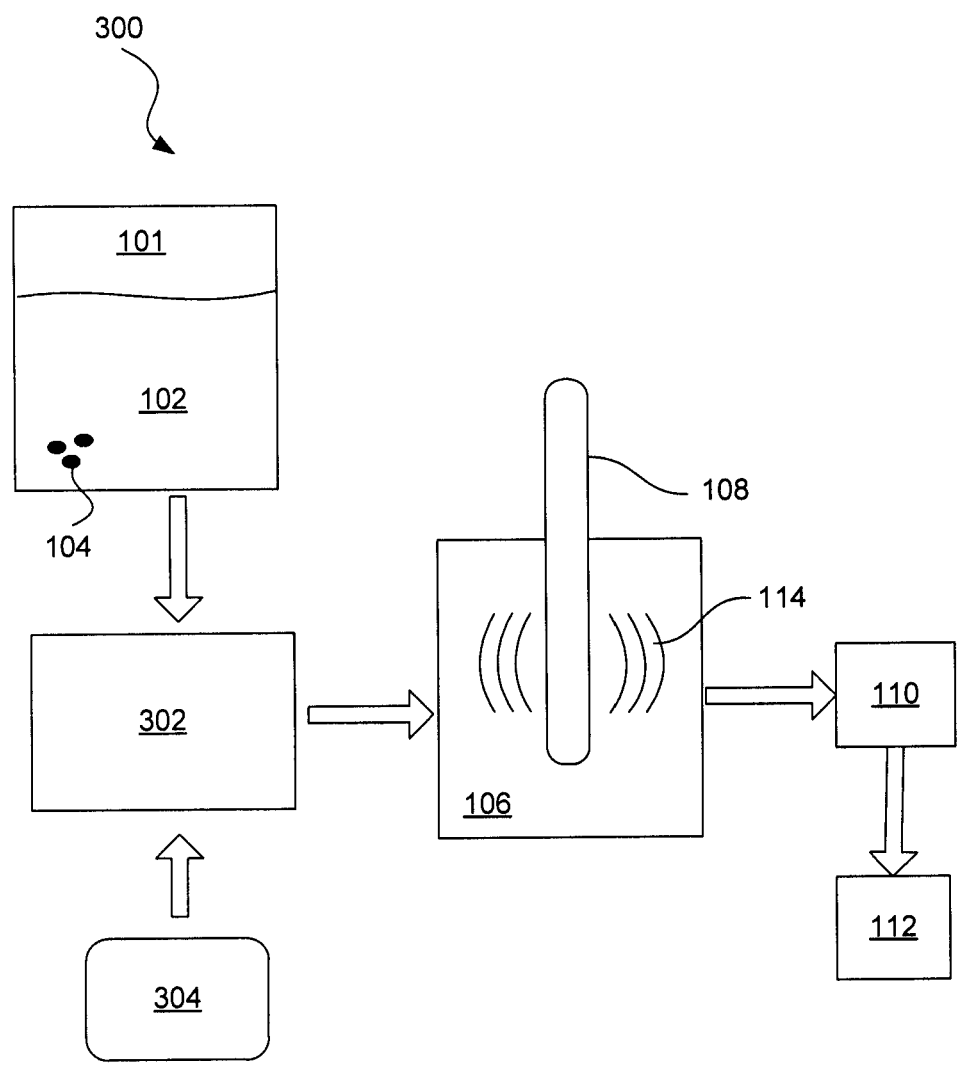
FIG. 3 is a diagram showing an illustrative CMP slurry delivery system with a mixing tank, according to one example of principles described herein.

FIG. 3 is a diagram showing an illustrative CMP slurry delivery system 300 with a mixing tank. According to the present example, the CMP slurry 102 is delivered to a mixing tank 302 before being delivered to the agitation tank 106. The mixing tank 302 may be used to mix in various additives 304 into the CMP slurry 102. Various additives 304 may be used to help with the particular CMP process for which the CMP slurry 102 will be used. Additionally, additives 304 may be used to alter the viscosity of the CMP slurry 102. In some cases, the viscosity may be changed to help the particle breakup during agitation.

Figure 4:
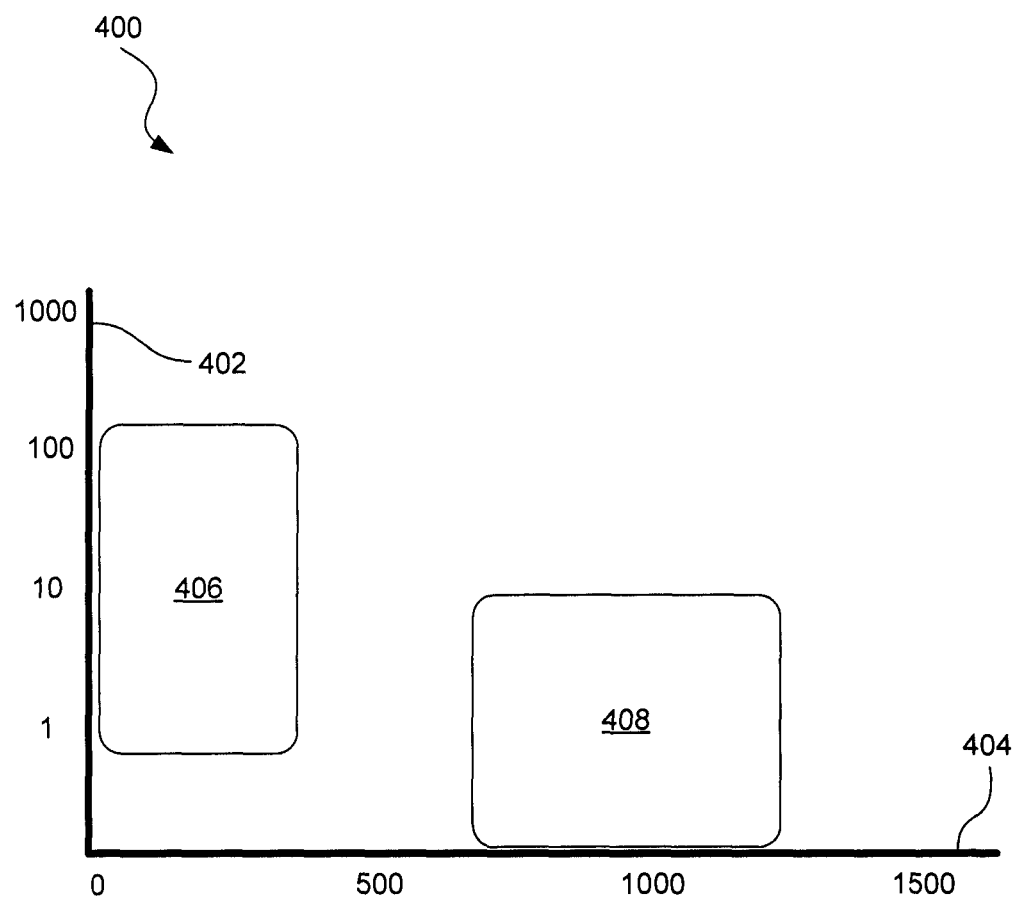
FIG. 4 is a graph showing ultrasonic and megasonic frequency ranges with respect to particle sizes, according to one example of principles described herein.

FIG. 4 is a graph 400 showing ultrasonic and megasonic frequency ranges with respect to particle sizes. According to the present example, the horizontal axis 404 of the graph 400 represents frequency and the vertical axis of the graph 402 represents particle size. The particle size is measured in nanometers and the frequency is measured in kilohertz.

The ultrasonic frequencies 406 range from about 20 kilohertz to 325 kilohertz. These frequencies 406 may be used to break up particles having a size between 1 and 100 micrometers. Applying these frequencies 406 may reduce the average particle size from about 5 micrometers to 0.64 micrometers.

The megasonic frequencies 408 range from about 40 kilohertz to 1250 kilohertz. These frequencies 408 may be used to break up smaller particles having a size between 0.1 micrometers and 10.0 micrometers. Applying these frequencies 408 may reduce the average particle size even further from 0.64 micrometers to about 0.23 micrometers.

In some examples, a CMP delivery system with a single agitation tank may be set to apply different frequencies. Thus, the CMP slurry does not have to be removed and delivered to different tanks. The frequencies selected to be applied by the agitation mechanism of the agitation tank may be set according to the nature of the CMP particles to be broken up. For example, a particular CMP slurry may already have an average particle size around 0.5 micrometers. In such a case, there may be no need to apply the ultrasonic frequencies 406. Instead, only the megasonic frequencies 408 may be applied.

In some cases, the agitation mechanism may be set to vary the frequency applied over time. For example, the agitation mechanism may be set to start at one frequency, and slowly increase or decrease in frequency within a specified range. In some cases, that specified range may be the range of ultrasonic frequencies 406 or megasonic frequencies 408 as illustrated in FIG. 4.

Figure 5A:
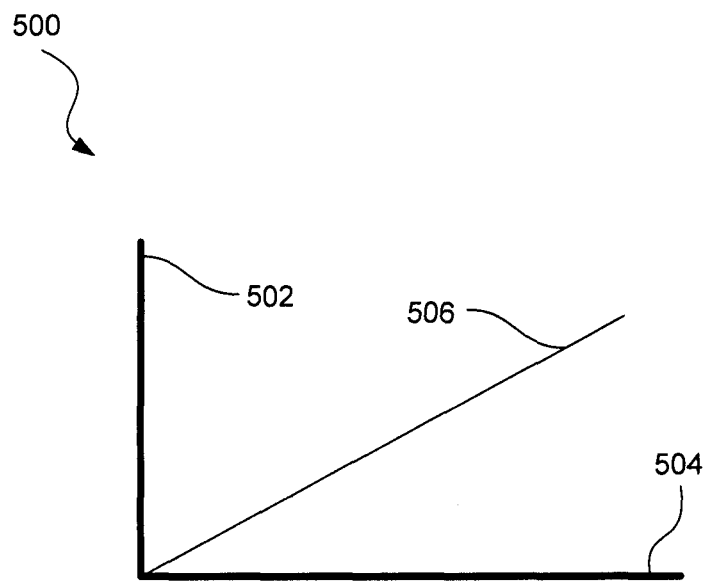
FIGS. 5A and 5B are graphs showing illustrative variations in frequency over time, according to one example of principles described herein.
Figure 5B:
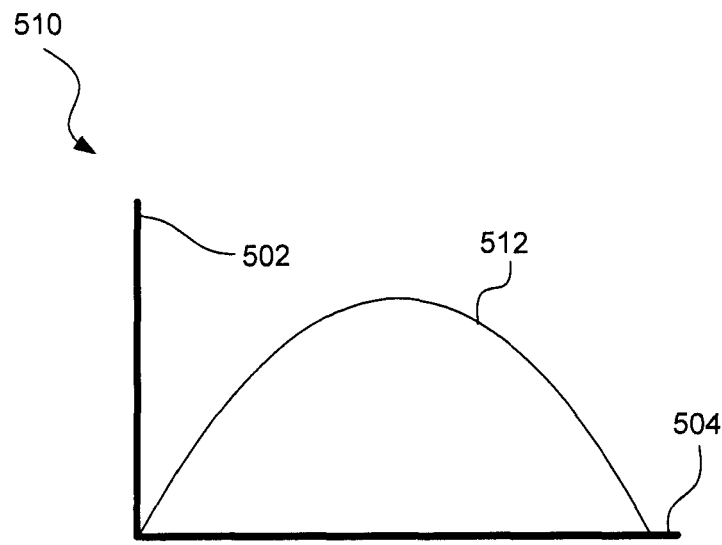

FIGS. 5A and 5B are graphs showing illustrative variations in frequency over time. According to the present example, FIG. 5A illustrates a linear change in frequency over time. FIG. 5B illustrates an exponential change in frequency over time. In both graphs 500, 510 the horizontal axis 504 represents time and the vertical axis 502 represents frequency.

FIG. 5A illustrates a linear change 506 in frequency over time. Specifically, the graph 500 illustrates a steady linear increase of frequency over time. In some cases, there may be a linear increase in frequency followed by a linear decrease in frequency. By doing so, a different range of frequencies is applied to the particles. This helps breakup particles of varying sizes because some frequencies may be better suited to breaking up particles of particular size than other frequencies.

FIG. 5B illustrates an exponential change 512 in frequency over time. Specifically, the graph 510 represents an exponential increase followed by an exponential decrease. This creates a change 512 in frequency that is similar to an upside down bell curve.

Other exponential changes may be used in accordance with principles described herein. For example, the change in frequency may represent a simple exponential increase in frequency over time. Alternatively the change in frequency may represent a simple exponential decrease in frequency over time. Moreover, the nature of the exponential increase or decrease may be different.

In some cases, the nature of the exponential increase or decrease may be set so that certain frequency ranges are more commonly applied than others. These more commonly applied frequency ranges may be selected based on the nature of the CMP slurry involved. For example, if a particular CMP slurry has a greater number of particles of a particular size, then the more commonly applied frequencies may be the frequencies that are better suited for breaking up particles of that particular size.

In some examples where multiple tanks are involved, different agitation tanks may be set to apply different variations in frequency over time. For example, a first agitation tank may apply a linear decrease in frequency over time while a second agitation tank applies an exponential increase in frequency over time. In another example, a first agitation tank will apply both an exponential increase and an exponential decrease in frequency over time. A second agitation tank may also apply an exponential increase and exponential decrease in frequency over time but within a different frequency range.

In addition to varying the frequency over time, the agitation mechanisms may be set to vary the power levels over time. For example, the agitation mechanisms may either select a set power level, or vary that power level within a set range. One example of a range may be between 1 and 20 watts per gallon. In cases, with multiple tanks, each different agitation tank may be set to agitate at different power levels. Like selection of different frequencies, the selected power levels may be selected for particular types of CMP slurries to more effectively break up the particles within those CMP slurries.

Figure 6:
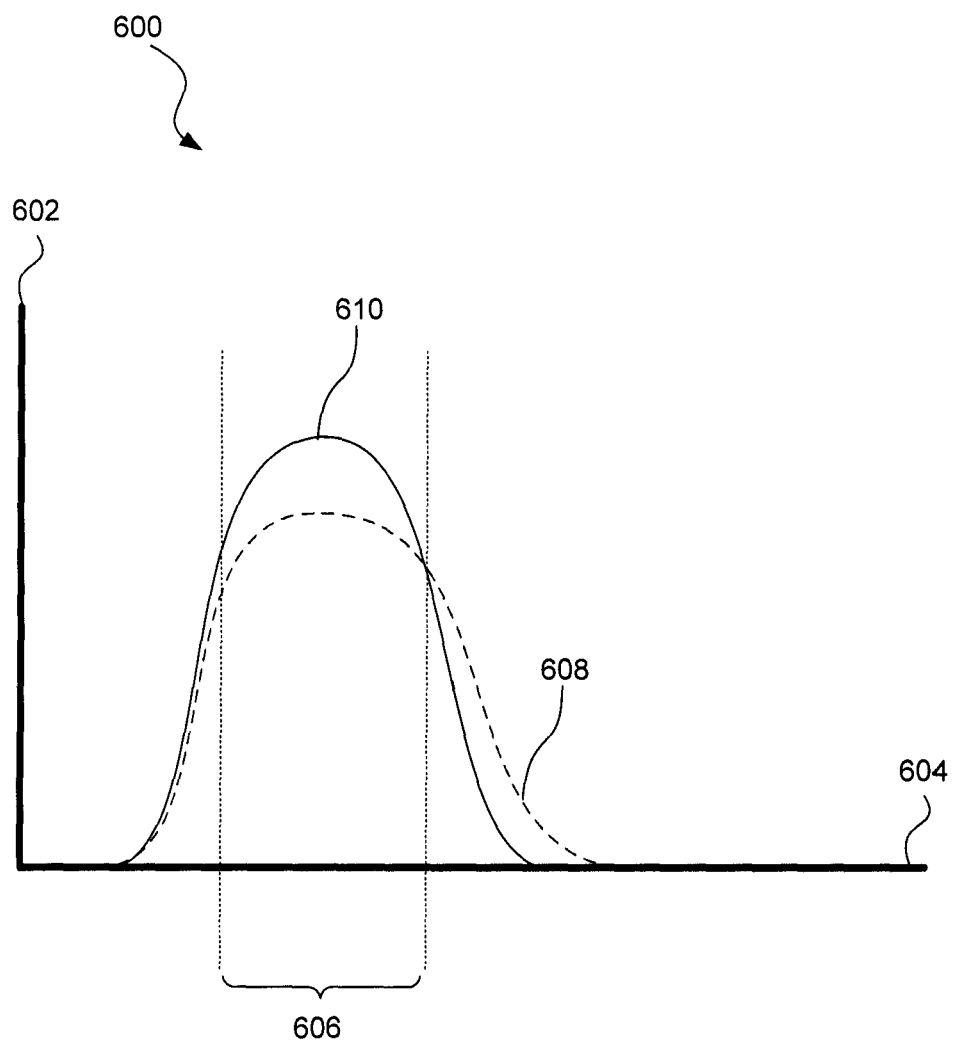
FIG. 6 is a graph showing changes in the working particle percentage, according to one example of principles described herein.

FIG. 6 is a graph 600 showing changes in the working particle percentage. According to the present example, the horizontal axis represents particle size 604. The vertical axis 602 represents the percentage of particles within the slurry that are of the corresponding size. The dotted line 608 represents the distribution of particles within a CMP solution before applying the agitation techniques embodying principles described herein. The solid line 610 represents the distribution of particles within the CMP solution after the agitation techniques are applied.

As illustrated, application of the agitation frequencies to the CMP slurry increases the number of particles within the working range 606 of particles. The working range 606 indicates the range of particles that are most useful for the CMP particles. These are the particles that are large enough to help grind down the surface of the substrate and not so large that they scratch the surface of the substrate in an unwanted manner. Because more of the particles are within the working range 606, there are much fewer particles that need to be filtered out. This allows for more efficient delivery of the CMP slurry to the CMP tool.

As shown in FIG. 6, the right side of the solid line 610 is further to the left than the right side of the dotted line 608. This indicates that the larger particles beyond the working range have been broken up in response to the agitation techniques being applied. In some cases, the agitation technique may be set so that after completion, the largest one percent of particles are about 230 nanometers and above.

As mentioned above, by reducing the average size of CMP slurry particles, a more efficient delivery may be realized. In some cases, the smaller average CMP slurry particle size may remove the need for a supply tank. A supply tank is sometimes used to hold the CMP slurry before delivering it to the filter. Because the filter has fewer particles to remove, the need for the supply tank may be removed.

A larger concentration of CMP slurry particles within the working range 606 allows more efficient delivery of CMP slurry to the CMP tool. This is due to the increased and more stable removal rate by the filter. This results in a shorter and more stable CMP process time. Additionally, it reduces the number of unwanted scratches on the surface of the substrate.

Figure 7:
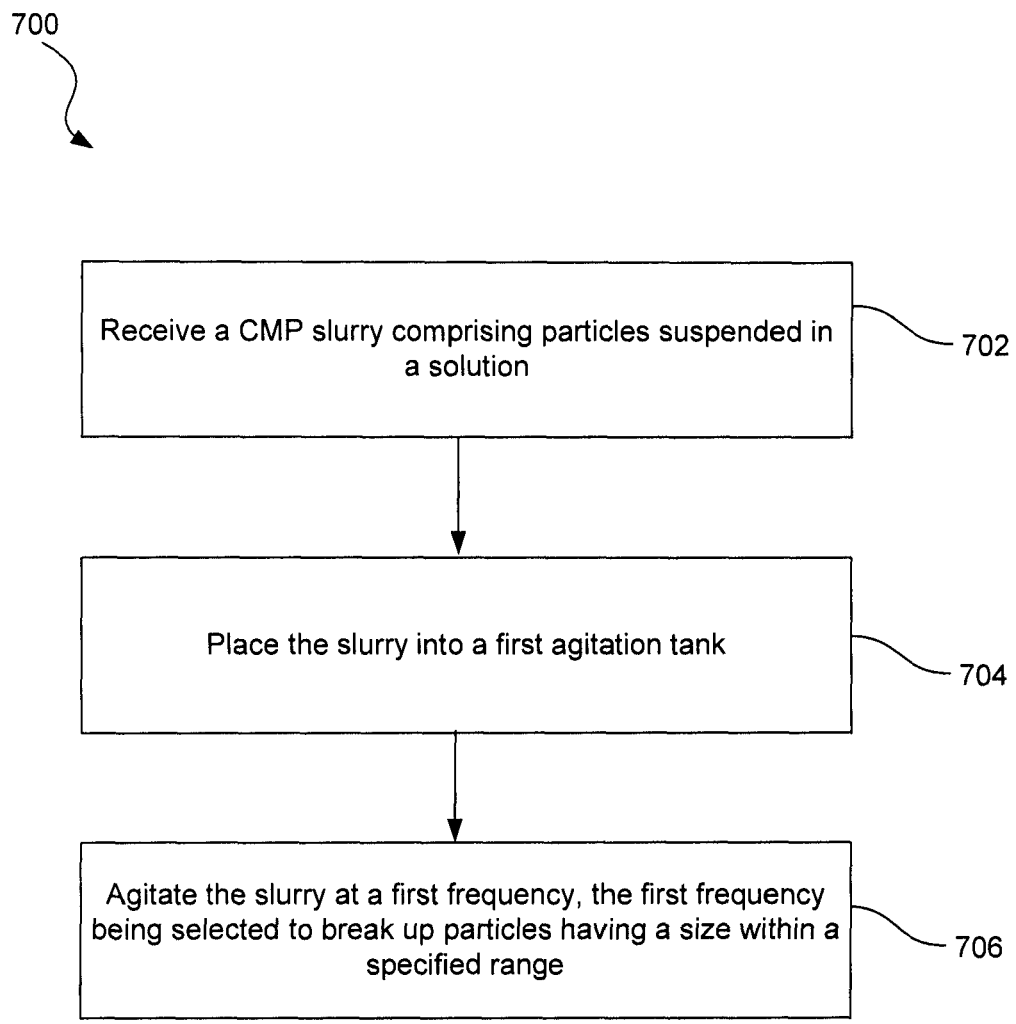
FIG. 7 is a flowchart showing an illustrative method for CMP slurry preparation, according to one example of principles described herein.

FIG. 7 is a flowchart showing an illustrative method for CMP delivery. According to certain illustrative examples, the method 700 for breaking up CMP slurry particles includes a step for receiving 702 a CMP slurry comprising particles suspended in a solution. The method 700 further includes a step for placing 704 the slurry into a first agitation tank. The method 700 further includes a step for agitating 706 the slurry at a first frequency, the first frequency being selected to break up particles having a size within a specified range.

According to certain illustrative examples, a method for breaking up Chemical Mechanical Polishing (CMP) slurry particles includes receiving a CMP slurry comprising particles suspended in a solution, placing the slurry into a first agitation tank, and agitating the slurry at a first frequency, the first frequency being selected to break up particles having a size within a specified range.

According to certain illustrative examples, a Chemical Mechanical (CMP) delivery system includes a number of agitation tanks, each tank comprising an agitation mechanism to agitate a CMP slurry at a frequency, the frequency for each agitation tank being selected to break up slurry particles within a specific size range. The system further includes a filter to remove particles that are larger than a specified allowable size, and a delivery mechanism to deliver the CMP slurry to a CMP tool.

According to certain illustrative examples, a method for breaking up Chemical Mechanical Polishing (CMP) slurry particles includes receiving a CMP slurry comprising particles suspended in a solution, placing the slurry into a first agitation tank, agitating the slurry at an ultrasonic frequency, the ultrasonic frequency being selected to break up particles having a size within a first specified range, placing the slurry into a second agitation tank, agitating the slurry at a megasonic frequency, the megasonic frequency being selected to break up particles having a size within a second specified range, and delivering the CMP slurry to a CMP tool.

It is understood that various different combinations of the above-listed embodiments and steps can be used in various sequences or in parallel, and there is no particular step that is critical or required. Additionally, although the term "electrode" is used herein, it will be recognized that the term includes the concept of an "electrode contact." Furthermore, features illustrated and discussed above with respect to some embodiments can be combined with features illustrated and discussed above with respect to other embodiments. Accordingly, all such modifications are intended to be included within the scope of this invention.

The foregoing has outlined features of several embodiments. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions and alterations herein without departing from the spirit and scope of the present disclosure.

What is claimed is:

1. A method for performing Chemical Mechanical Polishing (CMP), the method comprising:
   receiving a CMP slurry comprising particles suspended in a solution;
   placing the slurry into a first agitation tank;
   agitating the slurry in a first tank at a first frequency, the first frequency being selected to break up particles having a size within a first range;
   after agitation the slurry in the first tank at the first frequency, moving the slurry to a second tank;
   agitating the slurry in the second tank at a second frequency, the second frequency being selected to break up particles having a size within a second range that is different than the first range; and
   using the slurry with the broken-up particles to perform CMP.

2. The method of claim 1, further comprising, adjusting the first frequency while agitating the slurry.

3. The method of claim 2, wherein the adjusting is done in a linear manner.

4. The method of claim 3, wherein the adjusting of the first frequency is done with at least one of: an exponential increase and an exponential decrease.

5. The method of claim 1, wherein the first frequency is within one of: a megasonic range and an ultrasonic range.

6. The method of claim 1, further comprising, introducing a slurry additive before placing the slurry into the first agitation tank, the slurry additive helping the agitation to break up the particles.

7. The method of claim 1, wherein the first frequency is selected and the agitation is applied to the solution for a length of time to break up the particles so that the largest one percent of particles is larger than 230 nanometers.

8. The method of claim 1, further comprising, passing the slurry through a filter and feeding the slurry to a CMP tool.

9. A Chemical Mechanical (CMP) delivery system for use with a CMP tool, the delivery system comprising:
- a plurality of agitation tanks, each tank comprising an agitation mechanism to agitate a CMP slurry at a different frequency, the frequency for each agitation tank being associated with slurry particles within a specific size range, the agitating tanks being arranged to allow a CMP slurry to pass through each of the tanks in series;
- a filter to remove particles that are larger than a specified allowable size; and
- a delivery mechanism to deliver the CMP slurry to the CMP tool.

10. The system of claim 9, wherein the frequency of the first agitation tank is variable.

11. The system of claim 10, wherein the variable frequency of the first agitation tank varies in a linear manner.

12. The system of claim 10, wherein the variable frequency of the first agitation tank varies in at least one of: an increasing exponential manner and a decreasing exponential manner.

13. The system of claim 9, wherein the frequency for the first agitation tank is within one of: a megasonic range and an ultrasonic range.

14. The system of claim 9, further comprising a mixing tank to introduce a slurry additive to the CMP slurry before agitating the slurry, the slurry additive selected to help with breakup of the particles.

15. The system of claim 9, wherein the agitation mechanism applies the frequency at a specified power setting to break up the particles as desired.

16. The system of claim 15, wherein the agitation mechanism is to vary the power of the agitation over time.

17. A method for Chemical Mechanical Polishing (CMP), the method comprising:
- receiving a CMP slurry comprising particles suspended in a solution;
- placing the slurry into a first agitation tank;
- agitating the slurry within the first tank at an ultrasonic frequency, the ultrasonic frequency being selected to break up particles having a size within a first specified range;
- transferring the slurry from the first agitation tank to a second agitation tank;
- agitating the slurry within the second tank at a megasonic frequency, the megasonic frequency being selected to break up particles having a size within a second specified range;
- delivering the CMP slurry to a CMP tool; and
- performing CMP with the delivered CMP slurry.

18. The method of claim 17, further comprising, while agitating the slurry, adjusting at least one of the ultrasonic frequency and the megasonic frequency.

19. The method of claim 18, wherein the adjusting is done in a linear manner.

20. The method of claim 18, wherein the adjusting is done in a exponential manner.

* * * * *